US009013063B2

(12) United States Patent
Sato et al.

(10) Patent No.: US 9,013,063 B2
(45) Date of Patent: Apr. 21, 2015

(54) UNINTERRUPTIBLE POWER SUPPLY SYSTEM

(75) Inventors: Eduardo Kazuhide Sato, Minato-ku (JP); Masahiro Kinoshita, Minato-ku (JP); Yushin Yamamoto, Minato-ku (JP); Tatsuaki Amboh, Minato-ku (JP)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 799 days.

(21) Appl. No.: 13/256,958

(22) PCT Filed: Apr. 17, 2009

(86) PCT No.: PCT/JP2009/057752
§ 371 (c)(1),
(2), (4) Date: Sep. 16, 2011

(87) PCT Pub. No.: WO2010/119564
PCT Pub. Date: Oct. 21, 2010

(65) Prior Publication Data
US 2012/0013193 A1    Jan. 19, 2012

(51) Int. Cl.
*H02J 3/00*    (2006.01)
*H02J 9/06*    (2006.01)
*H02J 13/00*    (2006.01)

(52) U.S. Cl.
CPC ............. *H02J 9/062* (2013.01); *H02J 13/0055* (2013.01)

(58) Field of Classification Search
USPC ..................................................... 307/64–66
See application file for complete search history.

(56) References Cited

U.S. PATENT DOCUMENTS

| 7,105,949 | B2 * | 9/2006 | Wang et al. ..................... 307/51 |
| 7,265,458 | B2 * | 9/2007 | Edelen et al. .................. 307/65 |
| 7,400,066 | B2 * | 7/2008 | Tassitino et al. ............... 307/46 |
| 2003/0184160 | A1 * | 10/2003 | Yamamoto ...................... 307/64 |
| 2004/0240244 | A1 * | 12/2004 | Yamamoto ...................... 363/131 |
| 2005/0036253 | A1 * | 2/2005 | Tian et al. ...................... 361/66 |
| 2006/0043792 | A1 | 3/2006 | Hjort et al. |
| 2006/0043793 | A1 | 3/2006 | Hjort et al. |
| 2006/0043797 | A1 * | 3/2006 | Hjort et al. ..................... 307/46 |
| 2006/0044846 | A1 | 3/2006 | Hjort et al. |

(Continued)

FOREIGN PATENT DOCUMENTS

| CN | 101053138 A | 10/2007 |
| JP | 08 237885 | 9/1996 |

(Continued)

OTHER PUBLICATIONS

U.S. Appl. No. 13/498,009, filed Mar. 23, 2012, Sato, et al.

(Continued)

*Primary Examiner* — Jared Fureman
*Assistant Examiner* — Carlos LaGuerre
(74) *Attorney, Agent, or Firm* — Oblon, McClelland, Maier & Neustadt, L.L.P.

(57) ABSTRACT

In an uninterruptible power supply system, control sections of three uninterruptible power supply units are connected to one another by communication cables to configure one integrated control unit. The integrated control unit brings three switches into conduction if a bias feeding mode is selected by one arbitrary operation section and brings three switches into conduction if an inverter feeding mode is selected. Therefore, there is no need to separately provide an operation section and a control section for operating and controlling all of the uninterruptible power supply units.

6 Claims, 9 Drawing Sheets

(56) References Cited

U.S. PATENT DOCUMENTS

| | | | |
|---|---|---|---|
| 2006/0221523 A1* | 10/2006 | Colombi et al. | 361/90 |
| 2007/0114852 A1 | 5/2007 | Lin et al. | |
| 2008/0211308 A1* | 9/2008 | Lin et al. | 307/65 |
| 2009/0150818 A1* | 6/2009 | Bakhreiba et al. | 715/771 |
| 2011/0049991 A1 | 3/2011 | Sato et al. | |

FOREIGN PATENT DOCUMENTS

| | | |
|---|---|---|
| JP | 2000 201440 | 7/2000 |
| JP | 2003 052134 | 2/2003 |
| JP | 2003 289633 | 10/2003 |
| JP | 2004 357366 | 12/2004 |
| JP | 2006-54953 | 2/2006 |
| JP | 2008 182806 | 8/2008 |

OTHER PUBLICATIONS

U.S. Appl. No. 13/498,515, filed Mar. 27, 2012, Sato, et al.
U.S. Appl. No. 13/202,478, filed Aug. 19, 2011, Sato, et al.
Chinese Office Action issued Jun. 19, 2013, in China Patent Application No. 200980158805.6 (with English translation).
Extended Search Report issued Oct. 1, 2014 in Patent Application No. 09843345.1.
Office Action issued Sep. 21, 2012 in Korean Patent Application No. 11-2011-7021922 (with English translation).
International Search Report issued Jun. 30, 2009 in PCT/JP09/057752 filed Apr. 17, 2009.

* cited by examiner (a)

(b)

UNINTERRUPTIBLE POWER SUPPLY SYSTEM

TECHNICAL FIELD

The present invention relates to an uninterruptible power supply system and in particular to an uninterruptible power supply system including a plurality of uninterruptible power supply apparatuses connected in parallel.

BACKGROUND ART

Conventionally, uninterruptible power supply apparatuses have been widely used as power supply apparatuses for stably supplying alternating current (AC) power to an important load such as a computer system. In normal operation, an uninterruptible power supply apparatus converts commercial AC power into direct current (DC) power and supplies the DC power to a battery and also converts the DC power into AC power with commercial frequency to supply the AC power to a load. In power failure, the uninterruptible power supply apparatus converts DC power of the battery into AC power with commercial frequency to supply the AC power to the load. As such, even in power failure, AC power with commercial frequency can be supplied to the load.

There also is an uninterruptible power supply system including a plurality of uninterruptible power supply apparatuses connected in parallel. In this uninterruptible power supply system, even if one of the uninterruptible power supply apparatuses fails, the rest of the uninterruptible power supply apparatuses can drive the load (for example, see Patent Literature 1).

CITATION LIST

Patent Literature

PTL 1: Japanese Patent Laying-Open No. 2008-182806

SUMMARY OF INVENTION

Technical Problem

However, a conventional uninterruptible power supply system has a problem that the system is larger in size and higher in cost because apart from an operation unit and a control unit provided for each uninterruptible power supply apparatus for operating and controlling that uninterruptible power supply apparatus, an operation unit and a control unit for operating and controlling all the uninterruptible power supply apparatuses are separately provided.

Accordingly, a main object of the present invention is to provide a small-sized and low-cost uninterruptible power supply system.

Solution to Problem

An uninterruptible power supply system according to the present invention includes N (N is an integer not less than two) uninterruptible power supply apparatuses connected in parallel. Each uninterruptible power supply apparatus includes first and second input terminals which each receive first AC power from a commercial AC power supply, an output terminal which is connected to a load, a first switch which is connected between the first input terminal and the output terminal, a converter which converts the first AC power supplied from the commercial AC power supply via the second input terminal into DC power, an inverter which converts the DC power into second AC power, a chopper which supplies DC power from the converter to a power storage device when the first AC power is supplied and supplies DC power from the power storage device to the inverter when supply of the first AC power is stopped, a second switch which is connected between an output node of the inverter and the output terminal, an operation unit for selecting any power feeding mode from a first power feeding mode in which the first AC power is supplied to the load and a second power feeding mode in which the second AC power is supplied to the load, and a control unit which controls the first and second switches based on a selection result of the operation unit. N control units of the N uninterruptible power supply apparatuses are coupled to each other via a communication line to form one total control unit. The total control unit brings N first switches of the N uninterruptible power supply apparatuses into conduction when the first power feeding mode is selected by any one operation unit of N operation units of the N uninterruptible power supply apparatuses and brings N second switches of the N uninterruptible power supply apparatuses into conduction when the second power feeding mode is selected by any one operation unit of N operation units.

Preferably, the total control unit brings N sets of the first and second switches both into conduction for a predetermined time period before bringing N first switches out of conduction when switching from the first power feeding mode to the second power feeding mode and brings N sets of the first and second switches both into conduction for a predetermined time period before bringing N second switches out of conduction when switching from the second power feeding mode to the first power feeding mode.

More preferably, the communication line includes (N−1) sets of M (M is a natural number) communication cables provided respectively at (N−1) locations between the N control units, and each two of the control units are connected to each other by the M communication cables.

More preferably, the communication line includes N sets of M (M is a natural number) communication cables connecting the N control units in a loop, and each two of the control unit are connected to each other by the M communication cables.

Advantageous Effects of Invention

In an uninterruptible power supply system according to the present invention, N control units of N uninterruptible power supply apparatuses are connected to each other via communication lines to form one total control unit. This total control unit brings N first switches of the N uninterruptible power supply apparatuses into conduction when a first power feeding mode is selected by any one of N operation units of the N uninterruptible power supply apparatuses and brings N second switches of the N uninterruptible power supply apparatuses into conduction when a second power feeding mode is selected. As such, there is no need to separately provide an operation unit and a control unit for operating and controlling all the uninterruptible power supply apparatuses, and therefore, a smaller-sized and lower-cost system can be achieved.

DESCRIPTION OF EMBODIMENTS

Figure 1:
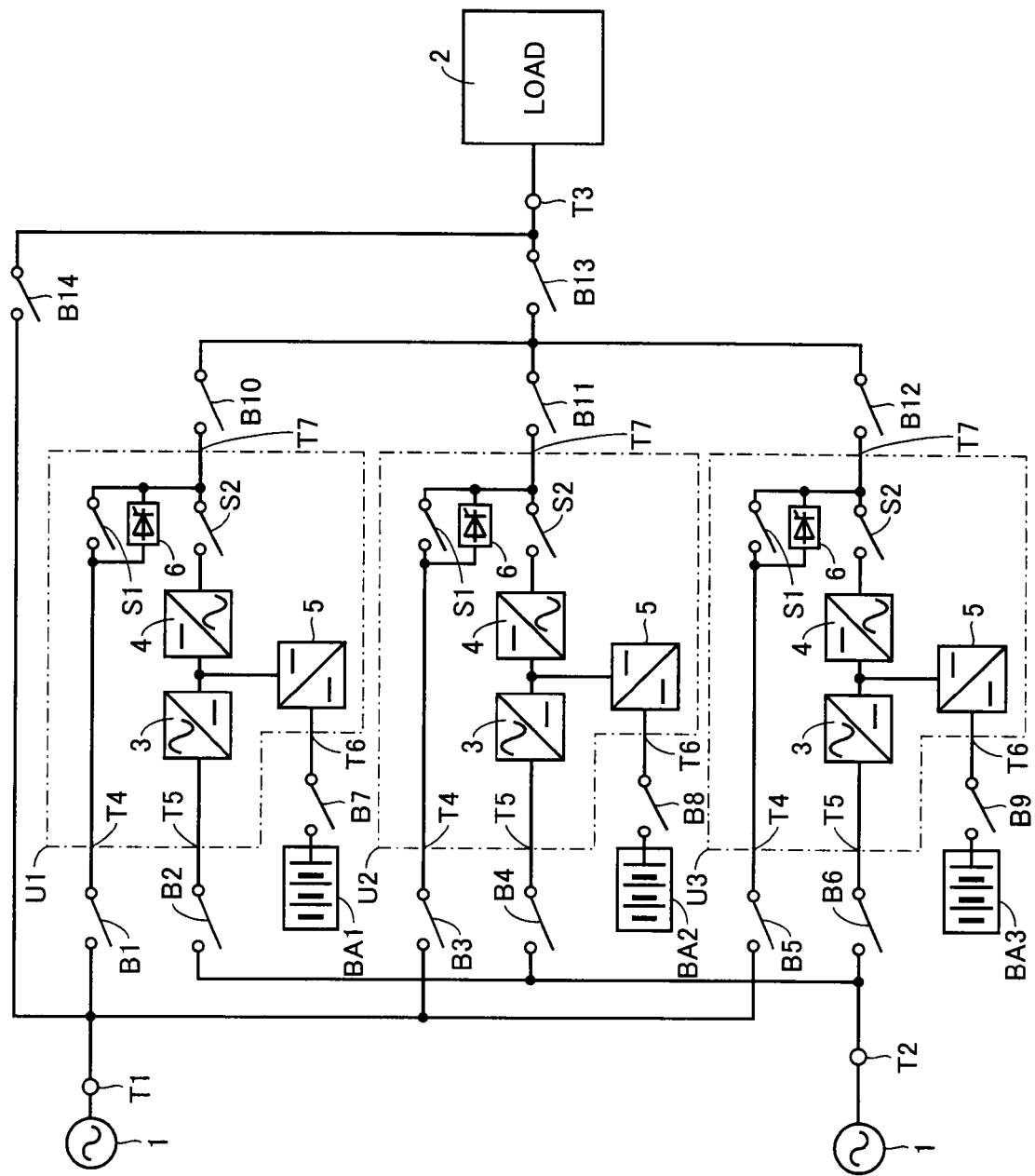
FIG. 1 is a circuit block diagram showing a configuration of an uninterruptible power supply system according to an embodiment of the present invention.

As shown in FIG. 1, this uninterruptible power supply system includes input terminals T1, T2, breakers B1 to B14, N (three in the drawing) uninterruptible power supply apparatuses U1 to U3, and N (three in the drawing) batteries BA1 to BA3, where N is an integer not less than two. Each of input terminals T1, T2 receives AC power from a commercial AC power supply 1.

Each of breakers B1, B3, B5 has one terminal connected to input terminal T1 together and the other terminal connected to an input terminal T4 of a respective one of uninterruptible power supply apparatuses U1 to U3. Each of breakers B2, B4, B6 has one terminal connected to input terminal T2 together and the other terminal connected to an input terminal T5 of a respective one of uninterruptible power supply apparatuses U1 to U3.

Each of breakers B7 to B9 has one terminal connected to a positive electrode of a respective one of batteries BA1 to BA3 and the other terminal connected to a battery terminal T6 of a respective one of uninterruptible power supply apparatuses U1 to U3. Each of breakers B10 to B12 has one terminal connected to an output terminal T7 of a respective one of uninterruptible power supply apparatuses U1 to U3 and the other terminal connected to one terminal of a breaker B13 together. The other terminal of breaker B13 is connected to an output terminal T3. Breaker B14 is connected between input terminal T1 and output terminal T3. Output terminal T3 is connected to load 2.

In normal operation of the uninterruptible power supply system, breakers B1 to B13 are turned ON and also breaker B14 are turned OFF such that AC power with commercial frequency is supplied from uninterruptible power supply apparatuses U1 to U3 to load 2.

Further, this uninterruptible power supply system is capable of driving load 2 with (N−1) uninterruptible power supply apparatuses. Thus, in FIG. 1, even if one uninterruptible power supply apparatus (for example, U1) of three uninterruptible power supply apparatuses U1 to U3 fails, load 2 can be driven by two uninterruptible power supply apparatus (in this case, U2 and U3). If failed uninterruptible power supply apparatus U1 is to undergo maintenance, breakers B1, B2, B7, B10 are turned OFF so that uninterruptible power supply apparatus U1 can be removed for maintenance while AC power with commercial frequency is being supplied from two uninterruptible power supply apparatuses U2, U3 to load 2.

Further, when the uninterruptible power supply system as a whole is to undergo maintenance, breakers B1 to B13 are turned OFF and also breaker B14 is turned ON so that uninterruptible power supply apparatuses U1 to U3 can be removed for maintenance while AC power from commercial AC power supply 1 is being supplied via breaker B14 to load 2.

In addition to input terminals T4, T5, battery terminal T6 and output terminal T7 described above, uninterruptible power supply apparatus U1 includes a converter 3, an inverter 4, a chopper 5, an STS 6, and electromagnetic switches S1, S2. Converter 3 converts AC power supplied from commercial AC power supply 1 via input terminal T5 into DC power. DC power generated by converter 3 is supplied to inverter 4 and chopper 5.

Inverter 4 converts DC power into AC power with commercial frequency. Chopper 5 supplies DC power generated by converter 3 via battery terminal T6 and breaker B7 to the positive electrode of battery BA1 in normal operation and supplies DC power of battery BA1 to inverter 4 in power failure of commercial AC power supply 1. Switch S2 has one terminal which receives output power of inverter 4 and the other terminal connected to output terminal T7. STS 6 is connected between input terminal T4 and output terminal T7, and switch S1 is connected in parallel with STS 6.

Uninterruptible power supply apparatus U1 has a bypass power feeding mode in which AC power supplied from commercial AC power supply 1 via input terminal T4 is outputted to output terminal T7 via switch S1 and an inverter power feeding mode in which AC power generated by inverter 4 is outputted to output terminal T7 via switch S2. In the bypass power feeding mode, switch S1 is turned ON, in the inverter power feeding mode switch S2 is turned ON, and during a period for switching between the bypass power feeding mode and the inverter power feeding mode, both switches S1, S2 are turned ON. If inverter 4 fails while power is being fed in the inverter power feeding mode, STS 6 turns ON and instantaneously provides output terminal T7 with AC power from commercial AC power supply 1. Uninterruptible power supply apparatuses U2, U3 also have the same configuration as that of uninterruptible power supply apparatus U1.

Figure 2:
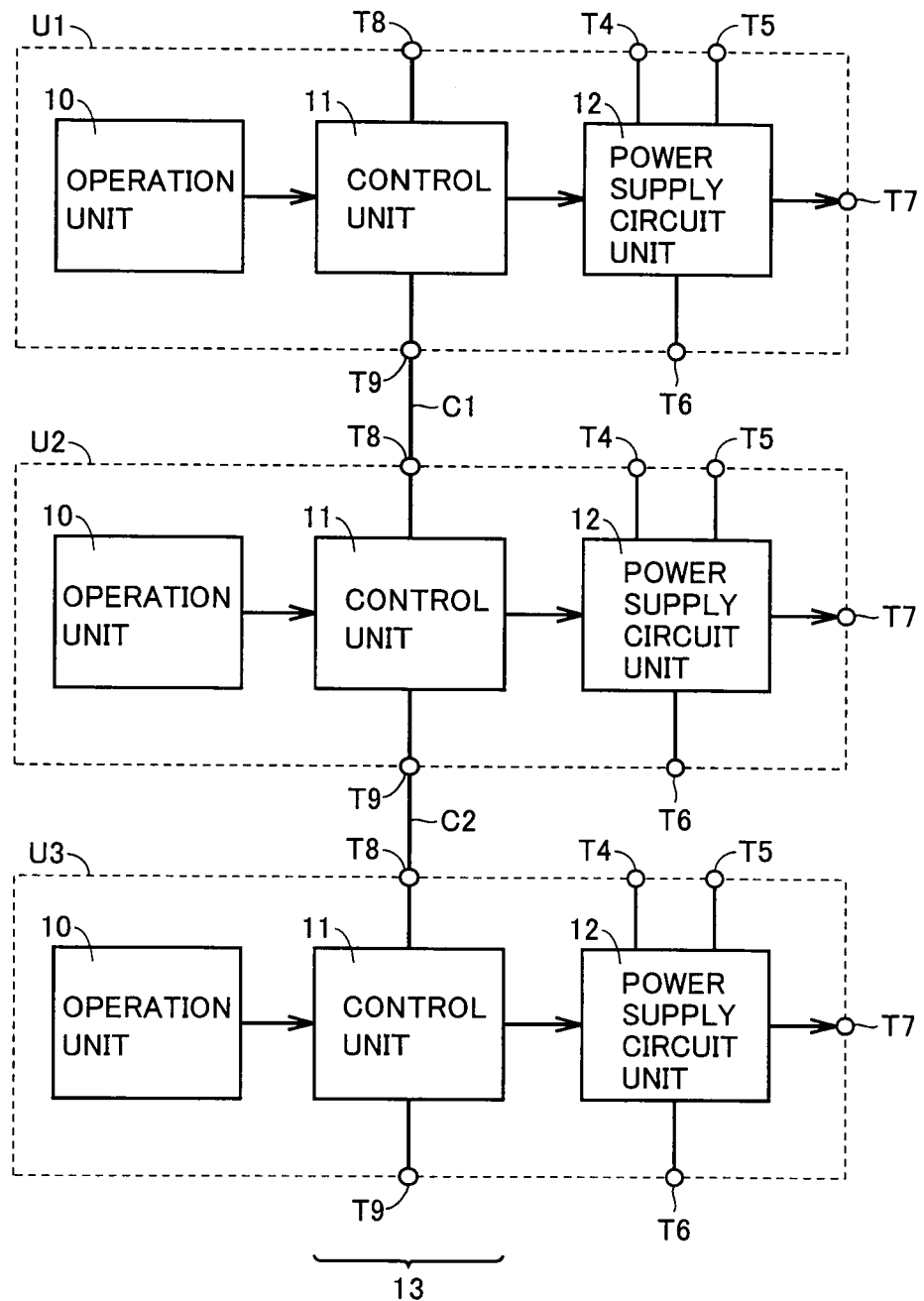
FIG. 2 is a block diagram showing a control-related portion of the uninterruptible power supply system shown in FIG. 1.

FIG. 2 is a block diagram showing a control-related portion of the uninterruptible power supply system. Each of uninterruptible power supply apparatuses U1 to U3 includes an operation unit 10, a control unit 11, a power supply circuit unit 12, input terminals T4, T5, battery terminal T6, output terminal T7, and communication terminals T8, T9. Power supply circuit unit 12 includes converter 3, inverter 4, chopper 5, STS 6, and switches S1, S2 shown in FIG. 1 and is connected to terminals T4 to T7.

Operation units 10 of uninterruptible power supply apparatuses U1 to U3 are used to operate uninterruptible power supply apparatuses U1 to U3, respectively.

Figure 3:
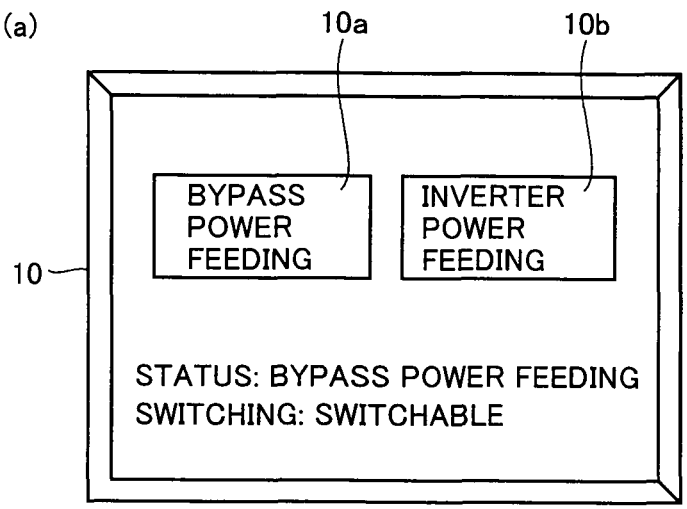
FIG. 3 shows an operation unit shown in FIG. 2.
Figure 3:
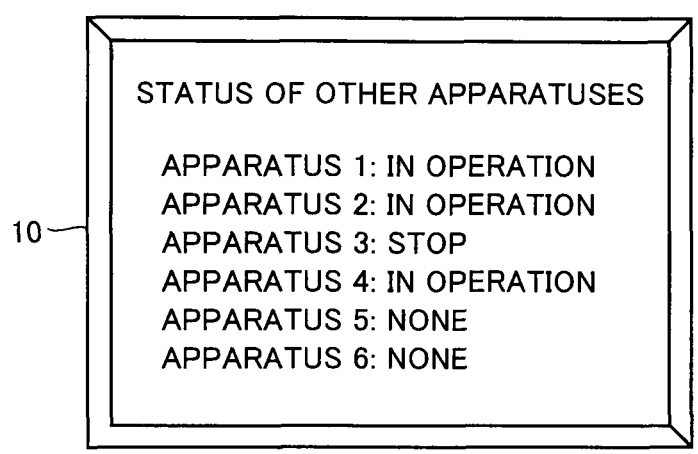

Further, each of operation units 10 of uninterruptible power supply apparatuses U1 to U3 is also used to operate the uninterruptible power supply system as a whole. Operation unit 10 is configured of a touch panel, for example. Operation unit 10 has a screen on which an icon 10a for selecting the bypass power feeding mode and an icon 10b for selecting the inverter power feeding mode are displayed, as shown in FIG. 3 (a). Further, displayed on the same screen are texts indicating the current status (type of power feeding mode) of the uninterruptible power supply system and texts indicating whether or not the power feeding mode is switchable.

In the bypass power feeding mode, when the mode is switchable, a touch on icon 10b causes an inverter-power-feeding-mode-command-signal commanding switching from the bypass power feeding mode to the inverter power feeding mode to be outputted from operation unit 10 to control unit 11. Further, in the inverter power feeding mode, when the mode is switchable, a touch on icon 10a causes a bypass-power-feeding-mode-command-signal commanding switching from the inverter power feeding mode to the bypass power feeding mode to be outputted from operation unit 10 to control unit 11.

It is noted that on the same screen, an icon (not shown) for selecting another page is also displayed. On another page, statuses of other uninterruptible power supply apparatuses (whether in operation or not, whether installed or not), for example, are displayed, as shown in FIG. 2 (b). Further, on still another page, an icon for operating only the corresponding uninterruptible power supply apparatus is also displayed.

Returning to FIG. 2, each control unit 11 controls corresponding power supply circuit unit 12, i.e., converter 3, inverter 4, chopper 5, STS 6, and switches S1, S2, in accordance with a signal from corresponding operation unit 10. Further, each control unit 11 is connected to communication terminals T8, T9. Communication terminal T9 of uninterruptible power supply apparatus U1 and communication terminal T8 of uninterruptible power supply apparatus U2 are connected by a communication cable C1, communication terminal T9 of uninterruptible power supply apparatus U2 and communication terminal T8 of uninterruptible power supply apparatus U3 are connected by a communication cable C2, and control units 11 of uninterruptible power supply apparatuses U1 to U3 form one total control unit 13.

Total control unit 13 controls three power supply circuit units 12 to perform the bypass power feeding mode when the bypass-power-feeding-mode-command-signal is given from any one operation unit 10 of three operation units 10. Further, total control unit 13 controls three power supply circuit units 12 to perform the inverter power feeding mode when the inverter-power-feeding-mode-command-signal is given from any one operation unit 10 of three operation units 10.

Specifically, the bypass-power-feeding-mode-command-signal or inverter-power-feeding-mode-command-signal outputted from operation unit 10 of uninterruptible power supply apparatus U1 is given to control unit 11 of uninterruptible power supply apparatus U1 and also to control units 11 of uninterruptible power supply apparatuses U2, U3, via communication cables C1, C2. Each control unit 11 controls switches S1, S2 of the corresponding uninterruptible power supply apparatus in accordance with the bypass-power-feeding-mode-command-signal or inverter-power-feeding-mode-command-signal.

Further, the bypass-power-feeding-mode-command-signal or inverter-power-feeding-mode-command-signal outputted from operation unit 10 of uninterruptible power supply apparatus U2 is given to control unit 11 of uninterruptible power supply apparatus U2 and also to control units 11 of uninterruptible power supply apparatuses U1, U3 via communication cables C1, C2. Each control unit 11 controls switches S1, S2 of the corresponding uninterruptible power supply apparatus in accordance with the bypass-power-feeding-mode-command-signal or inverter-power-feeding-mode-command-signal.

Further, the bypass-power-feeding-mode-command-signal or inverter-power-feeding-mode-command-signal outputted from operation unit 10 of uninterruptible power supply apparatus U3 is given to control unit 11 of uninterruptible power supply apparatus U3 and also to control units 11 of uninterruptible power supply apparatuses U1, U2 via communication cables C1, C2. Each control unit 11 controls switches S1, S2 of the corresponding uninterruptible power supply apparatus in accordance with the bypass-power-feeding -mode-command-signal or inverter-power-feeding-mode-command-signal.

Figure 4:
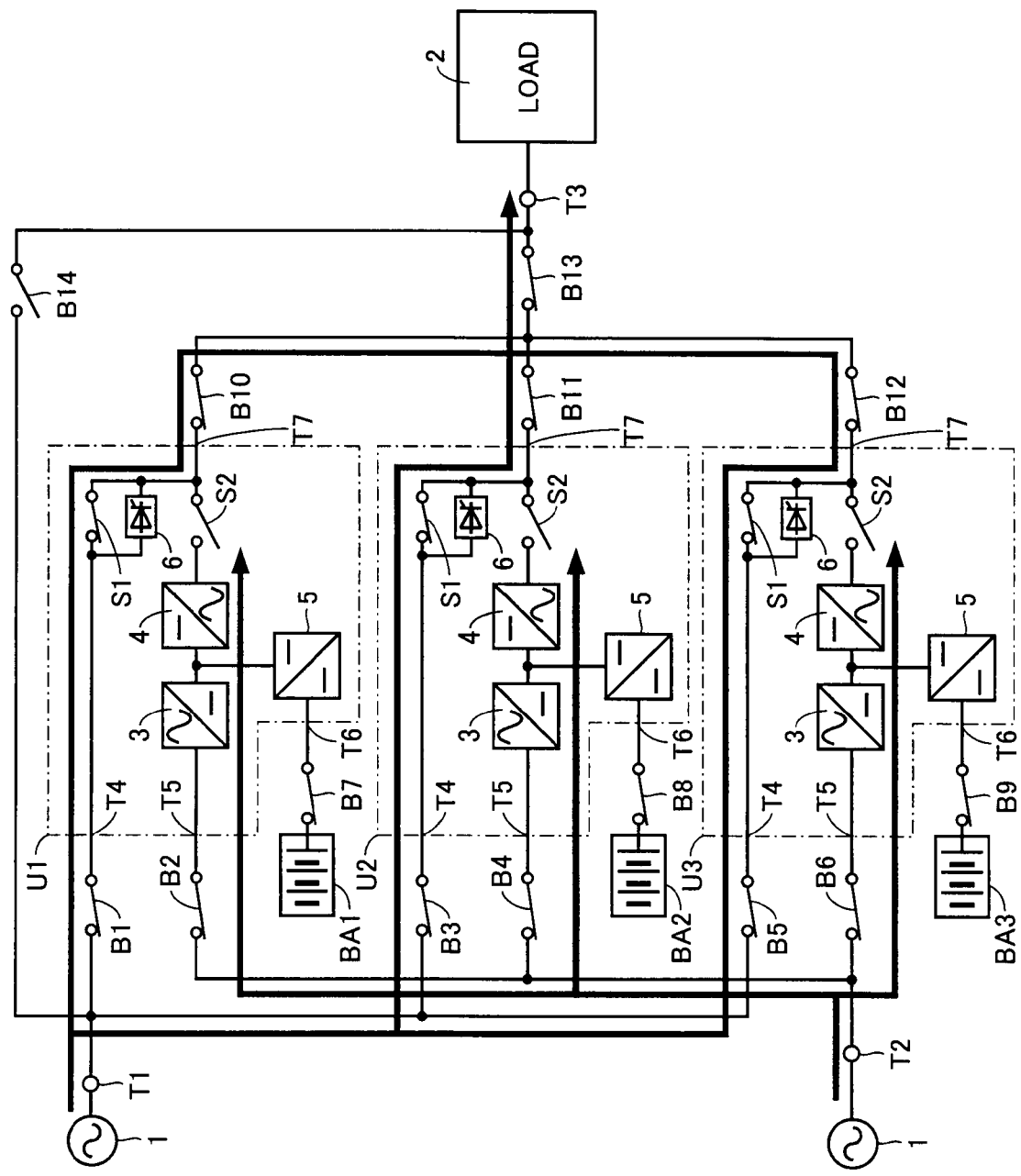
FIG. 4 is a circuit block diagram showing a bypass power feeding mode of the uninterruptible power supply system shown in FIG. 1.

FIG. 4 is a circuit block diagram showing current paths in the bypass power feeding mode. In FIG. 4, in bypass power feeding mode, breakers B1 to B13 are turned ON, breaker B14 is turned OFF, switches S1 are turned ON, and switches S2 are turned OFF. AC current is supplied from commercial AC power supply 1 via input terminal T1, breakers B1, B3, B5, input terminals T4, switches S1, output terminals T7, breakers B10 to B13, and output terminal T3 to load 2. Further, AC power is supplied from commercial AC power supply 1 via input terminal T2, breakers B2, B4, B6 and input terminals T5 to converters 3, DC power is supplied from converters 3 to inverters 4, and inverters 4 generate AC power with commercial frequency.

In the bypass power feeding mode, as shown in FIG. 3 (a), icon 10a of "bypass power feeding" and icon 10b of "inverter power feeding" are displayed on the screens of operation units 10. A touch on icon 10b of "inverter power feeding" on any one operation unit 10 of three operation units 10 causes the inverter-power-feeding-mode-command-signal to be given from that operation unit 10 to total control unit 13.

Figure 5:
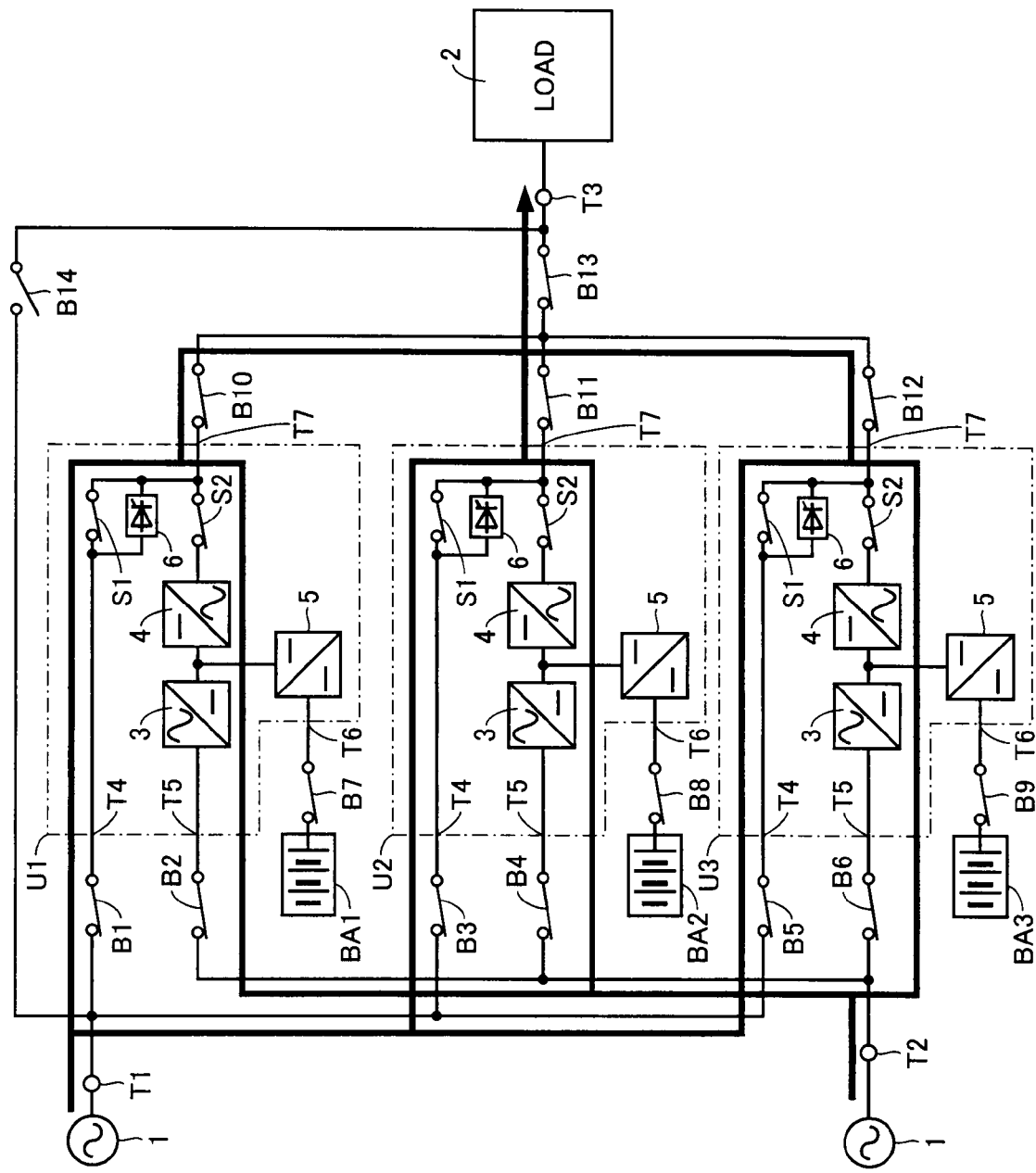
FIG. 5 is a circuit block diagram showing a state during a period for switching between power feeding modes of the uninterruptible power supply system shown in FIG. 1.
Figure 6:
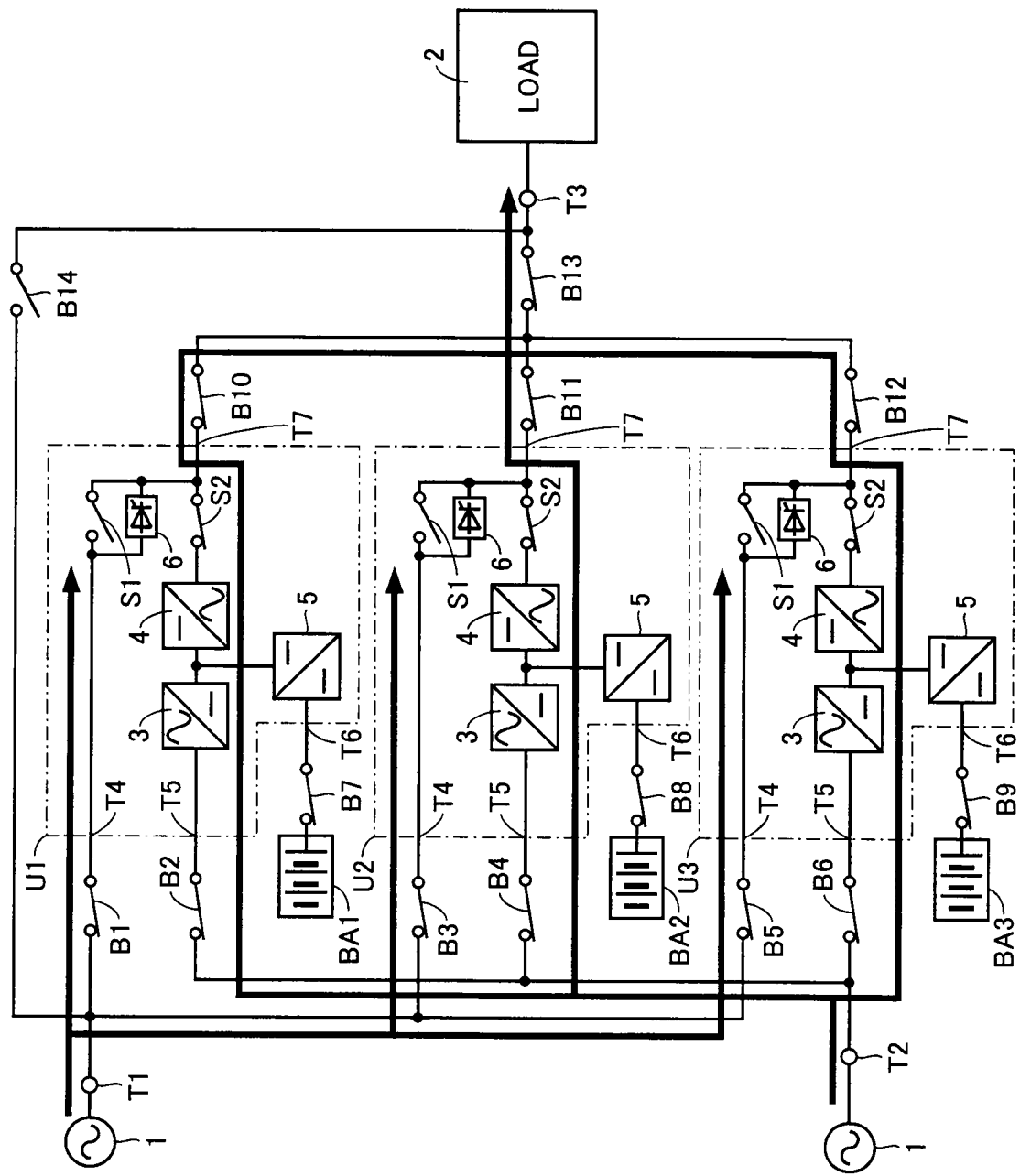
FIG. 6 is a circuit block diagram showing an inverter power feeding mode of the uninterruptible power supply system shown in FIG. 1.

In response to the inverter-power-feeding-mode-command-signal, total control unit 13 turns both switches S1, S2 ON for a predetermined time period, as shown in FIG. 5. During the period during which both switches S1, S2 are ON, AC power from commercial AC power supply 1 and AC power generated by inverters 4 are both supplied to load 2. Then, total control unit 13 turns switches Si OFF, as shown in FIG. 6. This results in that AC power from inverter 4 is supplied via switches S2, breakers B10 to B13 and output terminal T3 to load 2 and that AC power supplied from commercial AC power supply 1 via input terminal T1, breakers B1, B3, B5 and input terminals T4 is interrupted at switch S1.

When switching from the inverter power feeding mode shown in FIG. 6 to the bypass power feeding mode, after it is confirmed on any one operation unit 10 that the current status is "inverter power feeding" and switching is "switchable", a touch on icon 10a of "bypass power feeding mode" is made. This causes the bypass-power-feeding-mode-command-signal to be given from that operation unit 10 to total control unit 13.

In response to the bypass-power-feeding-mode-command-signal, total control unit 13 turns both switches S1, S2 ON for a predetermined time period, as shown in FIG. 5. During the period during which both switches S1, S2 are ON, AC power from commercial AC power supply 1 and AC power from inverters 4 are both supplied to load 2. Then, total control unit 13 turns switches S2 OFF, as shown in FIG. 4. This results in that AC power from inverters 4 is interrupted at switch S2 and that AC power from commercial AC power supply 1 is supplied via input terminal T1, breakers B1, B3, B5, input terminals T4, switches S1, breakers B10 to B13, and output terminal T3 to load 2.

It should be noted that switching from the bypass power feeding mode to the inverter power feeding mode is made in a start-up of the uninterruptible power supply system, while switching from the inverter power feeding mode to the bypass power feeding mode is made in a shut-down of the uninterruptible power supply system.

In this embodiment, control units 11 of three uninterruptible power supply apparatuses U1 to U3 are coupled to each other via communication cables C1, C2 to form one total control unit 13. This total control unit 13 brings three switches S1 into conduction when the bypass power feeding mode is selected by any one operation unit 10 and brings three switches S2 into conduction when the inverter power feeding mode is selected. As such, there is no need to separately provide an operation unit and a control unit for operating and controlling all the uninterruptible power supply apparatuses U1 to U3, and therefore, a smaller-sized and lower-cost system can be achieved.

Figure 7:
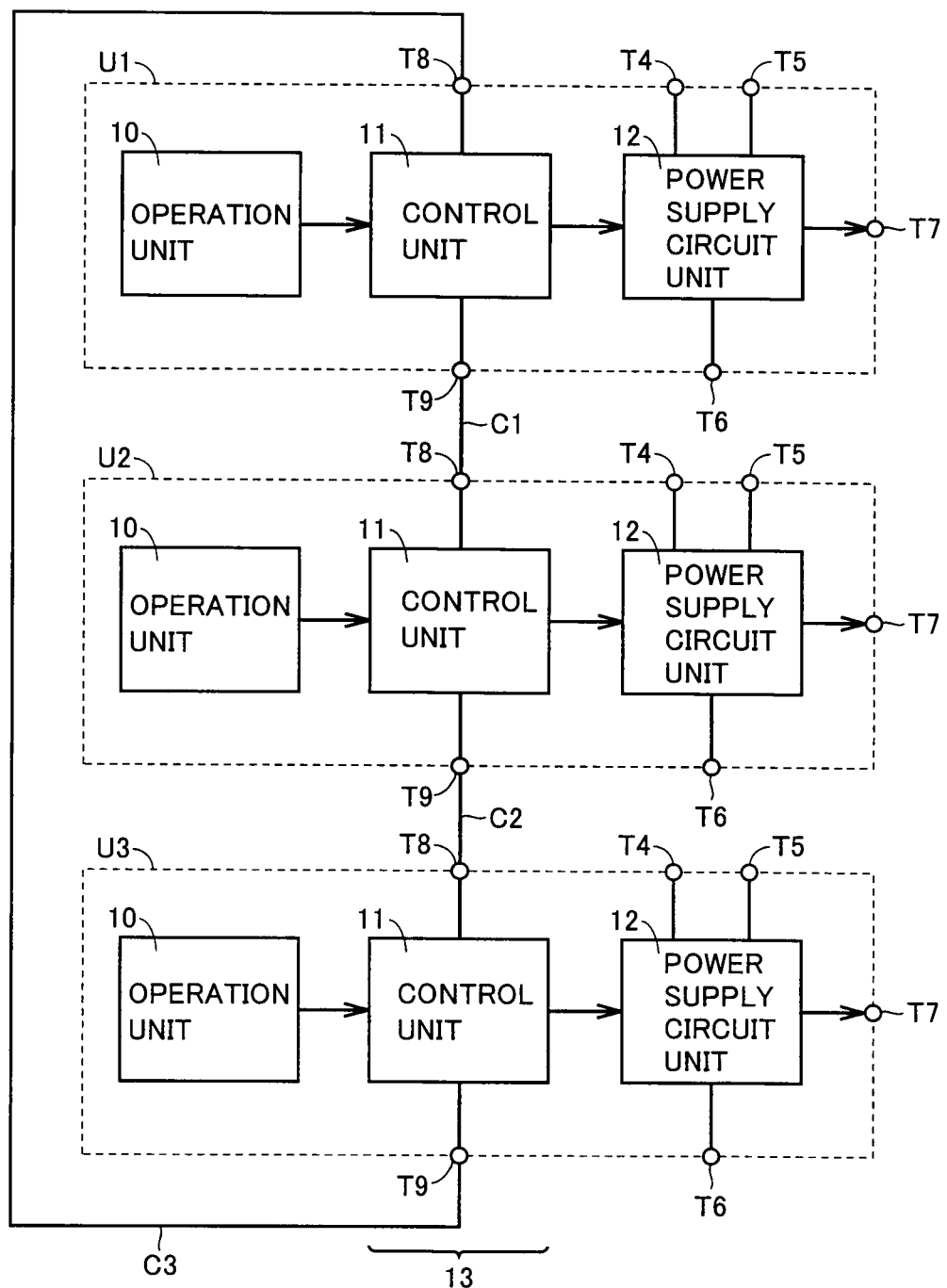
FIG. 7 is a block diagram showing a modification of the embodiment.

FIG. 7 is a block diagram showing a modification of the embodiment and to be compared with FIG. 2. In this modification, communication terminal T9 of uninterruptible power supply apparatus U1 and communication terminal T8 of uninterruptible power supply apparatus U2 are connected by communication cable C1, communication terminal T9 of uninterruptible power supply apparatus U2 and communication terminal T8 of uninterruptible power supply apparatus U3 are connected by communication cable C2, and communication terminal T9 of uninterruptible power supply apparatus U3 and communication terminal T8 of uninterruptible power supply apparatus U1 are connected by a communication cable C3. Three control units 11 of three uninterruptible power supply apparatuses U1 to U3 are connected in a loop by three cables C1 to C3 to form one total control unit 13. This modification can also provide the same effects as that in the embodiment.

Figure 8:
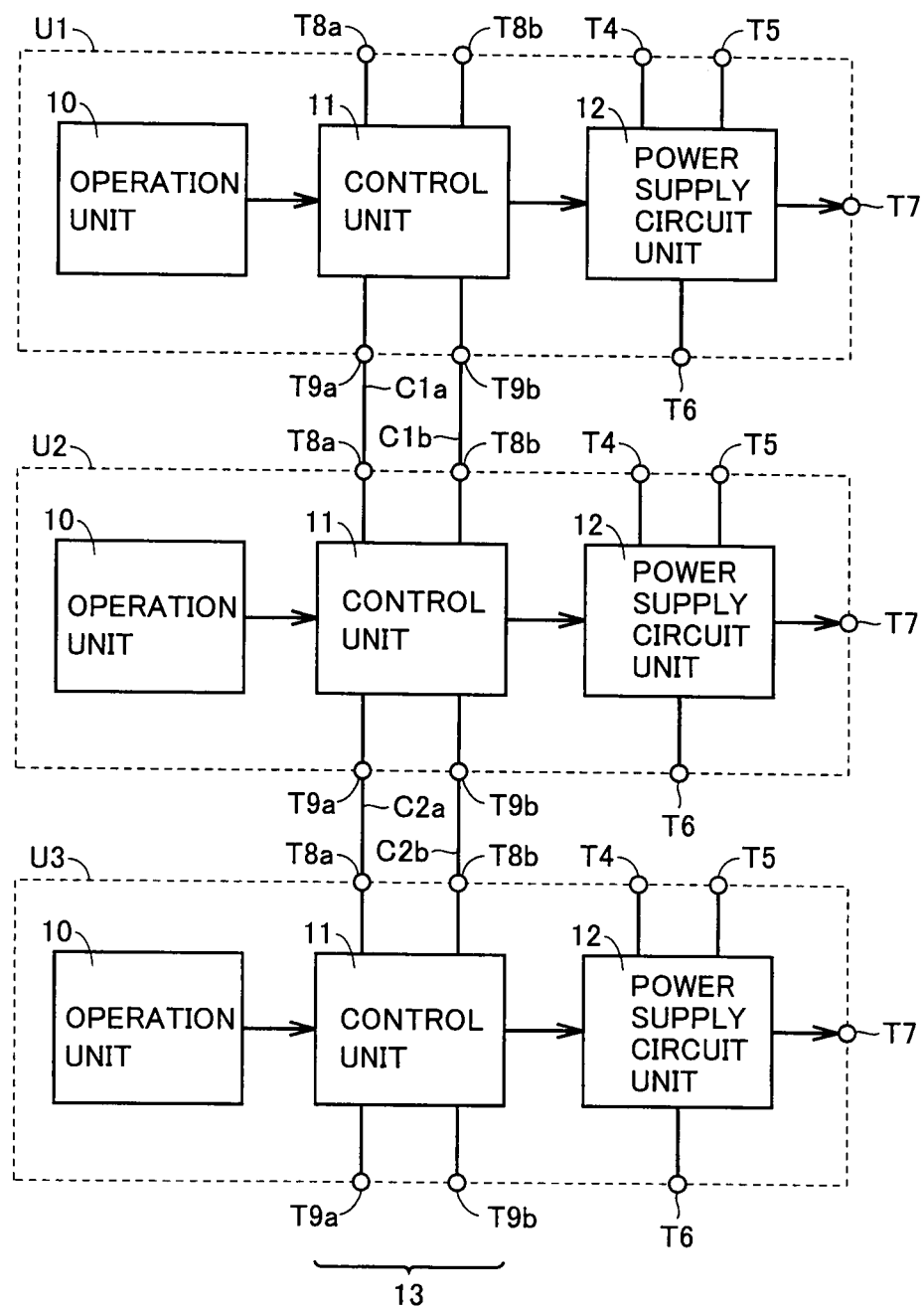
FIG. 8 is a block diagram showing another modification of the embodiment.

FIG. 8 is a block diagram showing another modification of the embodiment and to be compared with FIG. 2. In this modification, each of uninterruptible power supply apparatuses U1 to U3 includes four communication terminals T8a, T8b, T9a, T9b, and each control unit 11 is connected to the corresponding four communication terminals T8a, T8b, T9a, T9b. Communication terminals T9a, T9b of uninterruptible power supply apparatus U1 and communication terminals T8a, T8b of uninterruptible power supply apparatus U2 are connected by communication cables C1a, C1b, and communication terminals T9a, T9b of uninterruptible power supply apparatus U2 and communication terminals T8a, T8b, of uninterruptible power supply apparatus U3 are connected by communication cables C2a, C2b. Three control units 11 of three uninterruptible power supply apparatuses U1 to U3 are connected by two sets of two cables C1a, C1b; C2a, C2b to form one total control unit 13. This modification can also provide the same effects as that in the embodiment. It should be noted that three control units 11 of three uninterruptible power supply apparatuses U1 to U3 may be connected by two sets of three or more cables.

Figure 9:
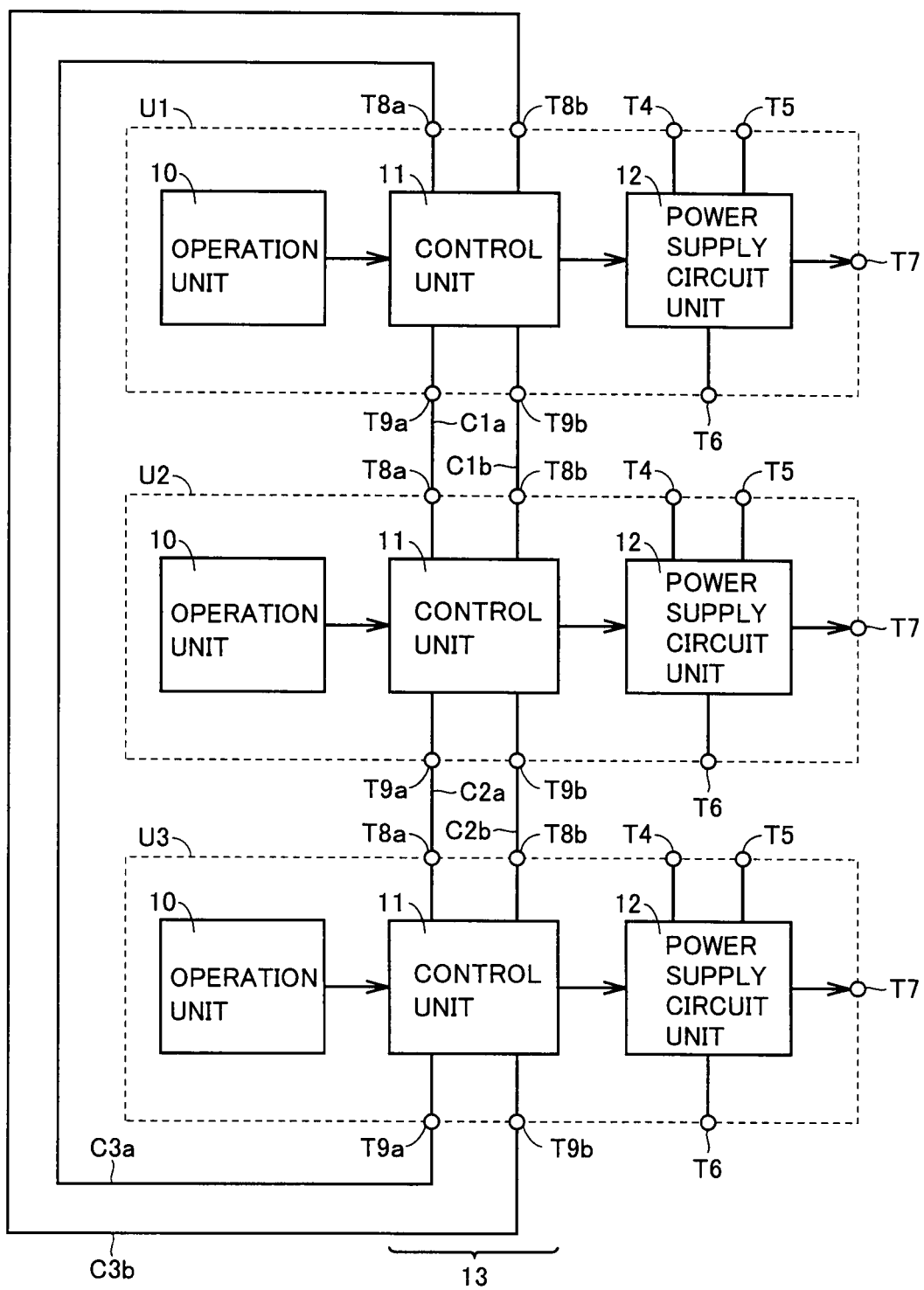
FIG. 9 is a block diagram showing still another modification of the embodiment.

FIG. 9 is a block diagram showing still another modification of the embodiment and to be compared with FIG. 8. In this modification, three control units 11 of three uninterruptible power supply apparatuses U1 to U3 are connected in a loop by three sets of two cables C1a, C1b; C2a, C2b; C3a, C3b to form one total control unit 13. This modification can also provide the same effects as that in the embodiment. It should be noted that three control units 11 of three uninterruptible power supply apparatuses U1 to U3 may be connected in a loop by three sets of three or more cables.

It should be understood that the embodiment disclosed herein is illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

1 commercial AC power supply; 2 load; 3 converter; 4 inverter; 5 chopper; 6 STS (Static Transfer Switch); 10 operation unit; 10a, 10b icon; 11 control unit; 12 power supply circuit unit; 13 total control unit; T terminal; B breaker; U uninterruptible power supply apparatus; BA battery; S switch; C communication cable.

The invention claimed is:

1. An uninterruptible power supply system comprising N (N being an integer not less than two) uninterruptible power supply apparatuses connected in parallel, each uninterruptible power supply apparatus including:

first and second input terminals each receiving first AC power from a commercial AC power supply;

an output terminal connected to a load;

a first switch connected between said first input terminal and said output terminal;

a converter converting said first AC power supplied from said commercial AC power supply via said second input terminal into DC power;

an inverter converting said DC power into second AC power;

a chopper supplying DC power from said converter to a power storage device when said first AC power is supplied and supplying DC power from said power storage device to said inverter when supply of said first AC power is stopped;

a second switch connected between an output node of said inverter and said output terminal;

an operation unit for selecting any power feeding mode from a first power feeding mode in which said first AC power is supplied to said load and a second power feeding mode in which said second AC power is supplied to said load; and a control unit controlling said first and second switches based on a selection result of said operation unit, N said control units of said N uninterruptible power supply apparatuses being coupled to each other via a communication line to form one total control unit, said total control unit bringing N said first switches of said N uninterruptible power supply apparatuses into conduction when said first power feeding mode is selected by any one said operation unit of N said operation units of said N uninterruptible power supply apparatuses and bringing N said second switches of said N uninterruptible power supply apparatuses into conduction when said second power feeding mode is selected by any one said operation unit of N said operation units, said communication line including (N−1) sets of M (M being a natural number) communication cables provided respectively at (N−1) locations between said N control units, and each two of said control units being connected to each other by the M communication cables, wherein said total control unit brings N sets of said first and second switches both into conduction simultaneously for a predetermined time period before bringing N said first switches out of conduction when switching from said first power feeding mode to said second power feeding mode and brings N sets of said first and second switches both into conduction for a predetermined time period before bringing N said second switches out of conduction when switching from said second power feeding mode to said first power feeding mode.

2. The uninterruptible power supply system according to claim 1, wherein said total control unit brings N said first switches of said N uninterruptible power supply apparatuses into conduction when said first power feeding mode is selected by any one said operation unit of N said operation units of said N uninterruptible power supply apparatuses absent control signals from remaining operations units of N said operation units other than the one said operation unit, and brings N said second switches of said N uninterruptible power supply apparatuses into conduction when said second power feeding mode is selected by any one said operation unit of N said operation units absent control signals from remaining operations units of N said operation units other than the one said operation unit.

3. The uninterruptible power supply system according to claim 1, wherein said total control unit
brings N said first switches of said N uninterruptible power supply apparatuses into conduction when said first power feeding mode is selected by only one said operation unit of N said operation units of said N uninterruptible power supply apparatuses, and
brings N said second switches of said N uninterruptible power supply apparatuses into conduction when said second power feeding mode is selected by only one said operation unit of N said operation units.

4. An uninterruptible power supply system comprising N (N being an integer not less than two) uninterruptible power supply apparatuses connected in parallel,
each uninterruptible power supply apparatus including:
first and second input terminals each receiving first AC power from a commercial AC power supply;
an output terminal connected to a load;
a first switch connected between said first input terminal and said output terminal;
a converter converting said first AC power supplied from said commercial AC power supply via said second input terminal into DC power;
an inverter converting said DC power into second AC power;
a chopper supplying DC power from said converter to a power storage device when said first AC power is supplied and supplying DC power from said power storage device to said inverter when supply of said first AC power is stopped;
a second switch connected between an output node of said inverter and said output terminal;
an operation unit for selecting any power feeding mode from a first power feeding mode in which said first AC power is supplied to said load and a second power feeding mode in which said second AC power is supplied to said load; and
a control unit controlling said first and second switches based on a selection result of said operation unit,
N said control units of said N uninterruptible power supply apparatuses being coupled to each other via a communication line to form one total control unit,
said total control unit bringing N said first switches of said N uninterruptible power supply apparatuses into conduction when said first power feeding mode is selected by any one said operation unit of N said operation units of said N uninterruptible power supply apparatuses and bringing N said second switches of said N uninterruptible power supply apparatuses into conduction when said second power feeding mode is selected by any one said operation unit of N said operation units,
said communication line including N sets of M (M being a natural number) communication cables connecting said N control units in a loop, and
each two of said control units being connected to each other by the M communication cables,
wherein
said total control unit brings N sets of said first and second switches both into conduction simultaneously for a predetermined time period before bringing N said first switches out of conduction when switching from said first power feeding mode to said second power feeding mode and brings N sets of said first and second switches both into conduction for a predetermined time period before bringing N said second switches out of conduction when switching from said second power feeding mode to said first power feeding mode.

5. The uninterruptible power supply system according to claim 4, wherein said total control unit
brings N said first switches of said N uninterruptible power supply apparatuses into conduction when said first power feeding mode is selected by any one said operation unit of N said operation units of said N uninterruptible power supply apparatuses absent control signals from remaining operations units of N said operation units other than the one said operation unit, and
brings N said second switches of said N uninterruptible power supply apparatuses into conduction when said second power feeding mode is selected by any one said operation unit of N said operation units absent control signals from remaining operations units of N said operation units other than the one said operation unit.

6. The uninterruptible power supply system according to claim 4, wherein said total control unit
brings N said first switches of said N uninterruptible power supply apparatuses into conduction when said first power feeding mode is selected by only one said operation unit of N said operation units of said N uninterruptible power supply apparatuses, and
brings N said second switches of said N uninterruptible power supply apparatuses into conduction when said second power feeding mode is selected by only one said operation unit of N said operation units.

* * * * *